US008806418B1

(12) United States Patent
Jallepalli et al.

(10) Patent No.: US 8,806,418 B1

(45) Date of Patent: Aug. 12, 2014

(54) SCALED SIGMA SAMPLING

(71) Applicants: Srinivas Jallepalli, Austin, TX (US); Earl K. Hunter, Gilbert, AZ (US); Elie A. Maalouf, Mesa, AZ (US); Venkataram M. Mooraka, Austin, TX (US); Sanjay R. Parihar, Austin, TX (US)

(72) Inventors: Srinivas Jallepalli, Austin, TX (US); Earl K. Hunter, Gilbert, AZ (US); Elie A. Maalouf, Mesa, AZ (US); Venkataram M. Mooraka, Austin, TX (US); Sanjay R. Parihar, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 13/921,897

(22) Filed: Jun. 19, 2013

(51) Int. Cl.
*G06F 17/50* (2006.01)
*G06F 11/22* (2006.01)

(52) U.S. Cl.
USPC .......................................................... 716/136

(58) Field of Classification Search
CPC ............ G06F 17/5036; G06F 17/5022; G06F 17/5081; G06F 17/5045; G06F 17/5068
USPC .......................................................... 716/136
See application file for complete search history.

(56) References Cited

U.S. PATENT DOCUMENTS

| | | | | |
|---|---|---|---|---|
| 6,356,861 | B1 * | 3/2002 | Singhal et al. | 703/2 |
| 6,571,202 | B1 * | 5/2003 | Loman et al. | 703/2 |
| 8,108,178 | B2 * | 1/2012 | Generazio | 702/179 |
| 8,112,728 | B1 * | 2/2012 | Hutton et al. | 716/104 |
| 8,155,938 | B2 | 4/2012 | Singhee et al. | |
| 8,301,431 | B2 | 10/2012 | Heragu et al. | |
| 2007/0044049 | A1 * | 2/2007 | Adams et al. | 716/4 |
| 2008/0141190 | A1 * | 6/2008 | Jung et al. | 716/4 |
| 2012/0046929 | A1 | 2/2012 | Joshi et al. | |
| 2012/0159419 | A1 * | 6/2012 | Wason et al. | 716/136 |

FOREIGN PATENT DOCUMENTS

WO 2012055045 A2 5/2012

OTHER PUBLICATIONS

Singhee, A. et al., "Recursive Statistical Blockade: An Enhanced Technique for Rare Event Simulation with Application to SRAM Circuit Design," IEEE 21st International Conference on VLSI Design; Jan. 4-8, 2008; 6 pages.

Solido Design Automation Inc., "Variation-Aware Custom IC Design: Improving PVT and Statistical Maximum Yield at the Performance Edge," printed from <<http://www.solidodesign.com/files/variation_aware_custom_ic_design_pvt_corners_monte_carlo.pdf>> on Feb. 25, 2013; 6 pages.

(Continued)

*Primary Examiner* — Jack Chiang
*Assistant Examiner* — Magid Dimyan

(57) ABSTRACT

A method can include generating a first set of sample values for input variables in accordance with a prescribed set of probability distributions, running a set of simulations on an electronic component based upon the first set of sample values, multiplying the standard deviations of the original distributions by a scaling factor λ, generating a second set of sample values for the input variables based on the probability distributions thus generated, and running a set of simulations on the electronic component based on this second set of sample values. The method can also include the generation of Q-Q plots based on the data from the first and second set of simulations and data from a truly normal distribution or the distribution obeyed by the independently varying input parameters; and the use of these plots for assessment of the robustness and functionality of the electronic component.

20 Claims, 9 Drawing Sheets

(56) References Cited

OTHER PUBLICATIONS

Seshadri, A. et al., "The Dynamic Stability of a 10T SRAM Compared to 6T SRAMs at the 32nm Node Using an Accelerated Monte Carlo Technique," IEEE Circuits and Systems Workshop: System-on-Chip—Design, Applications, Integration, and Software, Oct. 19-20, 2008; IEEE Dallas; pp. 1-4.
Reid, D. et al., "Statistical Enhancement of the Evaluation of Combined RDD- and LER-Induced VT Variability: Lessons From 105 Sample Simulations," IEEE Transactions on Electron Devices, Aug. 2011, vol. 58, No. 8; pp. 2257-2265.
Kanj, R. et al., "Mixture Importance Sampling and Its Application to the Analysis of SRAM Designs in the Presence of Rare Failure Events," 2006 43rd ACM/IEEE Design Automation Conference, Jan. 2006, ISBN 1-59593-381-6, pp. 69-72.
Sun, L. et al., "Statistical Blockade Method for Fast Robustness Estimation and Compensation of Nano-CMOS Arithmetic Circuits," 2011 International Symposium on Electronic System Design (ISED), Dec. 19-21, 2011, ISBN 978-1-457-1880-9, pp. 194-199.

* cited by examiner

SCALED SIGMA SAMPLING

FIELD OF THE DISCLOSURE

The present disclosure relates generally to statistical methods, and more particularly to sampling methods.

BACKGROUND

Under high-quality assurance programs it may be desirable to produce a design of an integrated circuit (IC) with very few defects, such as fewer than 3.4 defective parts per million with a Six Sigma quality program. To do so, process conditions across the operational spectrum must be sufficiently evaluated to determine IC robustness in rare conditions.

One way to evaluate an IC is to simulate the IC using an IC model. An IC model may describe an IC in terms of the number and types of components, the electrical connectivity of the components and the response of these components to electrical stimuli. One may use such an IC model to predict the electrical performance of an IC design. Using Monte Carlo techniques, assumed process conditions that vary may be repeatedly applied to an IC model to determine expected results. The variations imposed on the model are designed to comply with known probability distribution functions of the process or processes being varied.

Typically, the distribution of process parameters is a Gaussian distribution. Repeated simulations may require a significant amount of computational time because of the complexity of the models, the large number of components of a design being simulated, and the need to examine low-probability tails of the distribution to ensure a desired yield. By definition, the tails of a statistical distribution have low probabilities of occurrence. Thus, obtaining a high confidence estimate of these low probabilities may require running a large number of simulations.

BRIEF DESCRIPTION OF THE DRAWINGS

The present disclosure may be better understood, and its numerous features and advantages made apparent to those skilled in the art by referencing the accompanying drawings.

DETAILED DESCRIPTION

FIGS. 1-9 illustrate techniques and systems for evaluating the operation of integrated circuits (ICs). These techniques provide estimations of probability distribution functions of the circuit figures of merit that result from known variability in the manufacturing process. In particular, these techniques provide greater visibility to low probability tails of the distribution functions without requiring a large number of samples, even for ICs whose models may require long simulation times. The probability distribution functions can be used to estimate values of the circuits at a desired cumulative probability, and consequently to estimate the parametric yields of the ICs within predefined lower and upper specification limits. The distribution functions can also be used to assess the impact of a potential shift in the median of the circuit metrics on the yield of the ICs. Such a shift can be an intentional or unintentional shift in the process. As a result of applications of these techniques, the IC designs may be evaluated and modified as deemed necessary.

A first set of electrical simulations of an IC design, referred to as unscaled simulations, is carried out using samples of variables of the IC design and process, for example, that are randomly generated in accordance with the probability distribution functions governing their statistical variability. A second set of simulations, referred to as scaled simulations, is carried out by generating samples of the variables randomly generated in accordance with a scaled probability distribution function. The scaled probability distribution function for a process parameter is obtained by scaling the deviation of the quantiles of its original probability distribution function from the median by a factor that is greater than one ($\lambda>1$).

Next, Quantile-Quantile (Q-Q) plots of the two sets of simulations are produced. Examination of the Q-Q plots thus generated can be used to estimate the value of the circuit metrics at the required cumulative probability and the yield within the specification limits to provide visibility to IC failures that can be expected to occur at a rate that is below that which can be detected by traditional sampling techniques. For example, traditional sampling techniques may have difficulty in providing visibility to IC design failures below about 1000 parts per million (ppm), especially for designs with a large number of sensitive process parameters or those with very large simulation times. This difficulty can result due to unintentional disconnects between SPICE models used for design and production silicon or due to intentional process retargeting for product yield optimization often necessitate design robustness to at least about 1 ppm. Multiple instantiations of a circuit block in a product or its use in an array may also require examination of very low probability tails of a distribution function in evaluating an IC design.

Figure 1:
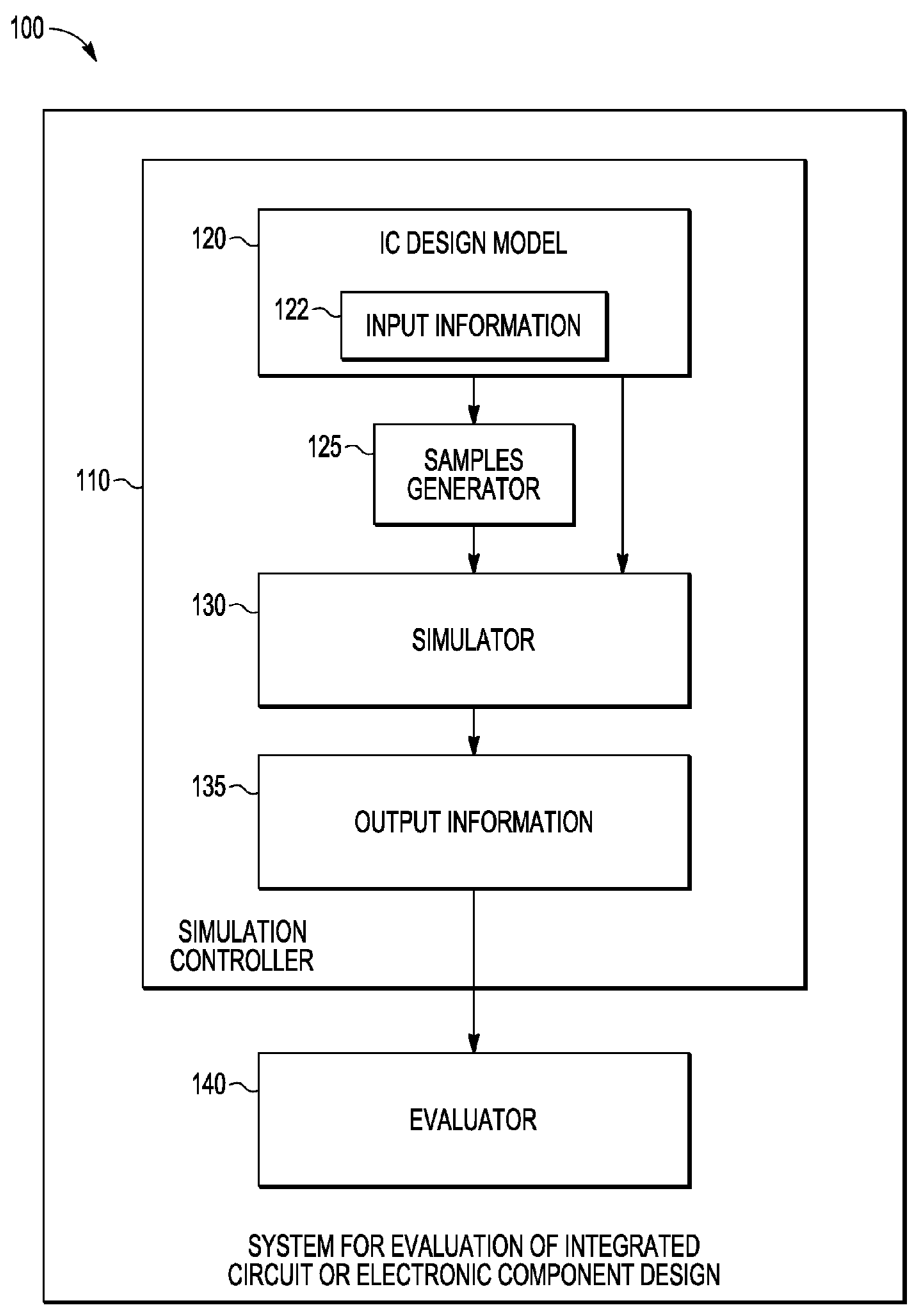
FIG. 1 is a block diagram illustrating a system to assess the robustness and functionality of an IC in accordance with a specific embodiment of the present disclosure.

FIG. 1 is a block diagram illustrating a system 100 to evaluate the robustness and functionality of an IC design in accordance with a specific embodiment of the present disclosure. System 100 includes simulation controller 110 and evaluator 140. The simulation controller 110 includes IC design model 120, samples generator 125, simulator 130, and output information 135.

The IC design model 120 can be used to simulate the behavior of an IC over a space of environmental variability. The IC design model 120 includes input information (inputs) 122 which describes the integrated circuit. The information of IC design model 120 can include descriptions of components, descriptions of interactions among components, descriptions of performance characteristics, descriptions of a manufacturing process used to fabricate an IC, and expected distributions of properties of the inputs. The information can also include data about relationships between attributes of the components and attributes of the integrated circuit. For example, in the case of an IC including field effect transistor devices, the information can describe the channel lengths, the channel widths, and the threshold voltages for the MOS transistors, as well as any other electrical or physical characteristics associated with the IC or its components. The performance characteristics can include timing information of components, such as rise times, fall times, propagation times, and the like. The information can also describe the effect of various environmental and process variables, such as operating voltages, temperatures, source/drain doping, interconnect dimensions, and interconnect materials. The information of IC design model 120, including the information of inputs 122, can be fed into samples generator 125 and simulator 130.

Samples generator 125 can provide samples of the components of the IC and other inputs to simulator 130. Samples generator 125 can, for example, provide specific instances of the components and other inputs to simulator 130 according to specified environmental conditions, which can include voltage and temperature, and the probability distributions governing the process behavior of the components and other inputs. These samples or instances include values of the characteristics of the IC being modeled, such as values for gate lengths and rise times.

In response to the inputs from inputs 122 and samples generator 125, the simulator 130 generates performance information that represents the expected performance of the IC in accordance with the parameters of provided by IC design model 120. Simulator 130 may be a simulation engine such as simulation program with integrated circuit emphasis (SPICE), which can be used to estimate the values of the circuit metrics based upon the information provided by the IC design model 120.

Output information 135 may include stored results, e.g., performance information, from multiple simulations. The samples generator 125 may, for example, generate 1000 sets of varied inputs based on the model; the simulator 130 may evaluate the model of the IC for each of the sets of inputs; and output information 135 can store and display the results of the 1000 simulation runs. In addition, the output information can be displayed; e.g., a graphical device coupled to the simulation controller.

Evaluator 140 evaluates the properties of the IC being simulated. Evaluator 140, for example, can evaluate whether an IC represented by the IC design model has sufficient margin to operate with sufficient reliability for a given application under a range of expected environmental, manufacturing, and operating conditions. For example, evaluator 140 can evaluate the operating properties of the simulated IC to determine a failure rate and decide whether the failure rate, e.g., yield, is acceptable. If the rate is not acceptable, then the design of the IC may be changed as a result of the modeling. An objective of the Six Sigma program in manufacturing is to limit defective parts to at most 3.4 per million.

The simulation controller 110 can provide simulation outputs that are based upon scaled sigma sampling as described in greater detail below. In this process, a set of unscaled simulations of the IC is carried out using samples of process variables randomly generated in accordance with the probability distribution functions governing their statistical variability; e.g., their expected variability. A scaled set of simulations is carried out by generating samples of process variables randomly generated in accordance with a scaled probability distribution function. The scaled probability distribution function for a process parameter is obtained by scaling the deviation of the quantiles of its original probability distribution function from the median by a factor $\lambda>1$.

A Quantile-Quantile (Q-Q) plot of each of the two sets of simulations is generated. The discussion of FIG. 3, below, describes the generation of Q-Q plots. Based on an examination of the two Q-Q plots, a cumulative Q-Q plot can be generated. The cumulative Q-Q plot can consist of the Q-Q plot of the unscaled simulations (unscaled Q-Q plot) in its region of confidence, extended by the tails of the Q-Q plot of the scaled simulations, the tails shifted to align with and match the slope of the tails of the unscaled Q-Q plot at the extremes of the valid tail region of the unscaled Q-Q plot. The region of confidence in the unscaled Q-Q plot can be a region including the median that contains a sufficient number of sample points. The cumulative Q-Q plot thus generated can be used to estimate a value of a circuit metric at a required cumulative probability and a yield within specification limits. In many embodiments, the estimation may be performed computationally, based an analysis of the points making up the cumulative Q-Q plot. In some embodiments, the estimation may be performed visually, by examination of a graph of the cumulative Q-Q plot.

Figure 2:
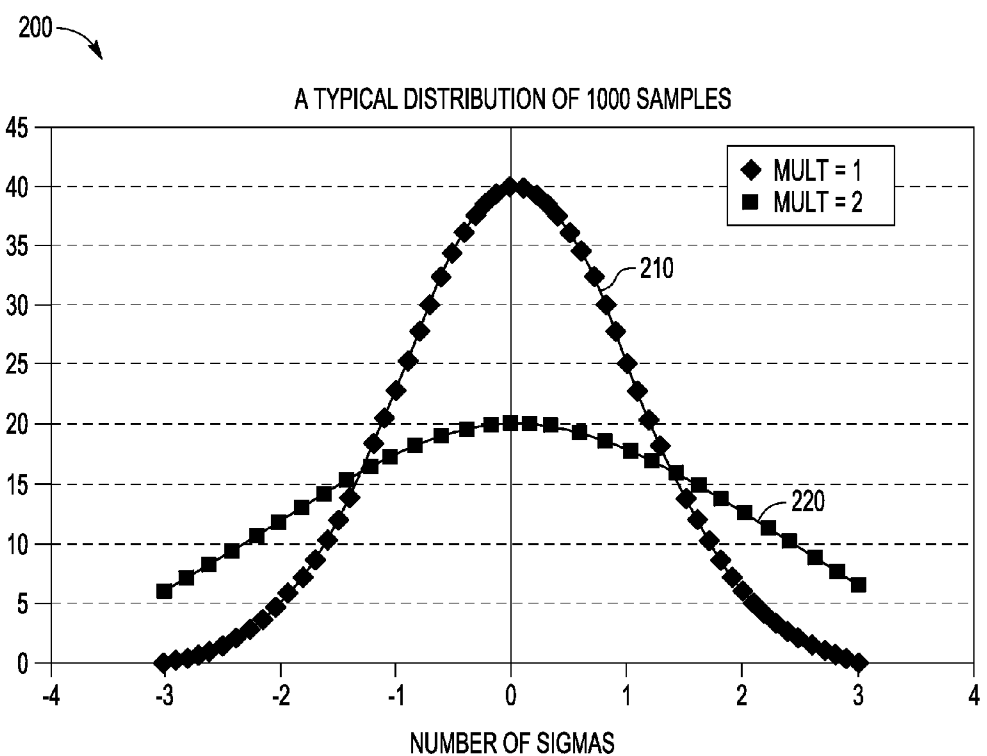
FIG. 2 is a graph illustrating the scaling of the probability distribution of a process parameter in accordance with a specific embodiment of the present disclosure.

FIG. 2 illustrates the process of scaling or multiplying the standard deviation of a probability distribution by a scaling factor $\lambda$. Graph 200 depicts a plot of two probability distributions with 1000 samples each. Plot 210 represents the original distribution, and plot 220 represents a distribution with a standard deviation that is obtained by multiplying the standard deviation of plot 210 by the scaling factor $\lambda$. As a result of the scaling, the distribution represented by plot 220 exhibits greater variability than the original distribution. The plots 210 and 220 can represent input information of an attribute of an integrated circuit, (e.g., gate length) which may affect yield. For plots 210 and 220, the x-axis indicates the number of standard deviations of shift from the median and the y-axis indicates a corresponding number of samples that are expected to be generated. The standard deviations are set/calculated for the original distribution. In the example of FIG. 2, the scaling factor $\lambda$ has a value of 2. As a result, the fraction of samples of plot 210 that are more than +1 sigma from the median is approximately the same as the fraction of samples of plot 220 that are more than +2 sigmas from the median. In general, for a distribution scaled by $\lambda$, the fraction of samples lying $\lambda n$ standard deviations from the median will approximately equal the fraction of samples of the original distribution that lie n standard deviations from the median.

Figure 3:
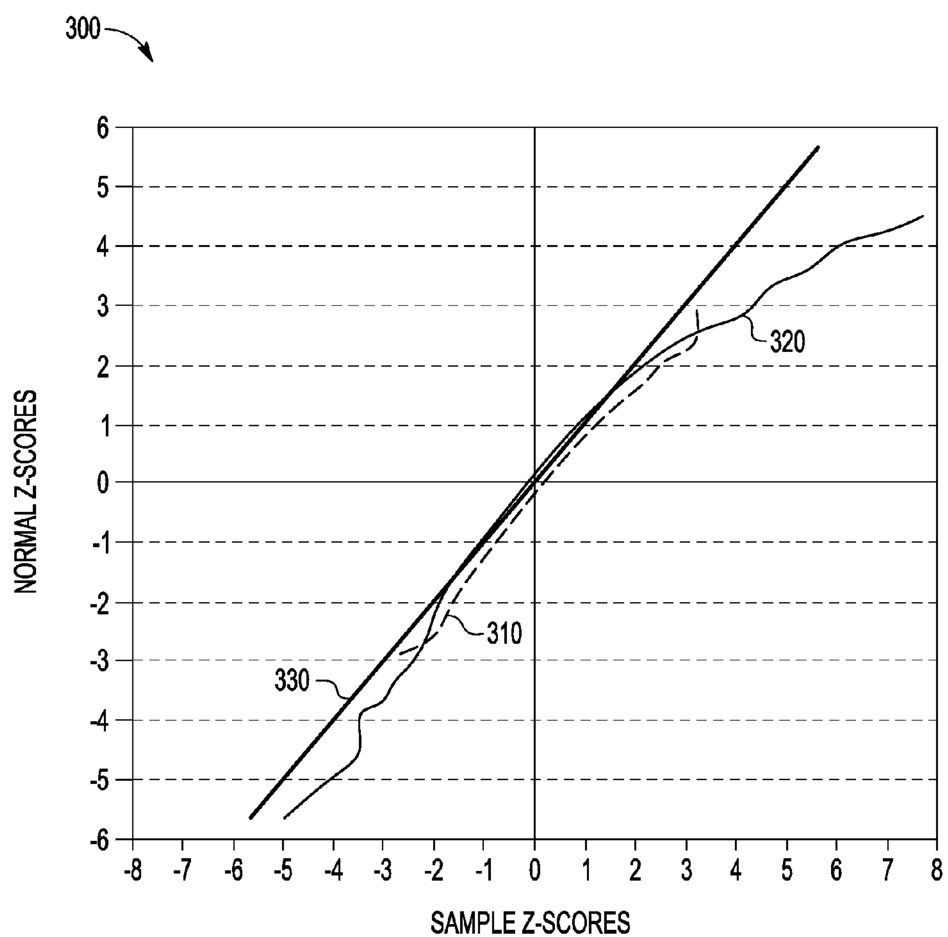
FIG. 3 is a graph illustrating a Quantile-Quantile (Q-Q) plot in accordance with a specific embodiment of the present disclosure.

FIG. 3 illustrates the nature of Q-Q plots. Graphs 300 contain Q-Q plots 310, 320, and 330. Plot 310 is a Q-Q plot of an unscaled distribution, plot 320 is a plot of the distribution scaled by a factor of 2, and plot 330 is a trend line that illustrates the behavior of a hypothetical IC exhibiting a linear response to process variability; that is, a linear change to the process variables produces a linear change in the outputs.

In plots 310, 320, and 330, each point (x, y) on one of the plots represents $(\sigma_v, \sigma_r)$, where $\sigma_v$ is the number of standard deviations (or sigmas) of a sample point away from the median of all the sample points, and $\sigma_r$ represents the number of standard deviations of shift from the median that correspond to the rank of the sample point. Thus, on either axis, a value of 0 represents a point on the median, and, for a normal distribution, a value of 1 represents a point at the $34^{th}$ percentile past the median, or the $84^{th}$ percentile of the distribution. For both the x and y-axis, these values, measured in terms of $\sigma$, are known as Z-scores. Thus, a sample Z-score of a point V, plotted on the X-axis, is equal to $$\frac{V - \text{median}}{\text{std\_deviation}}.$$

The y value of a point on plot 310; i.e., the normal Z-score, is obtained by rank ordering the sample points from the lowest value to the highest value. Each sample point is then assigned a rank. In one embodiment, the sample point with the smallest value can be assigned a rank of 1 and the sample point with the highest rank can be assigned a rank equal to the number of samples that have been simulated. In another embodiment, the ranks can range from 0 to one less than the total number of samples. Next, each sample point is assigned a percentage or percentile based on its ranking. Finally, the percentile is converted to a Z-score by determining the number of sigmas or standard deviations the ranking lies away from the median, assuming a normal distribution. In the embodiment of FIG. 3, the ith point in ranking was assigned the percentile (i−0.5)/201, where plots 310 and 320 display samples of 201 points. From the known behavior of a Gaussian distribution, this percentile was used to obtain the number of standard deviations of shift from the median for the point in the ranking. The Z-score of a point p on plot 310 can thus be expressed as $$Z-\text{score}\ (p) = (NORMSINV((\text{rank}\ p) - 0.5)/201) \qquad \text{Eq. 1}$$

where the function NORMSINV returns the inverse of the standard normal cumulative distribution.

The x-values on scaled plot 320 were calculated as in plot 310, using the formula $$\frac{V - \text{median}}{\text{std\_deviation}}.$$

The value of the standard deviation used in the denominator is the unscaled standard deviation. The y-values or normal Z-scores are calculated as for plot 310, and then multiplied by the scaling factor, 2. The Z-score of a point p on plot 310 can thus be expressed as $$Z-\text{score}\ (p) = 2 * (NORMSINV((\text{rank}\ p) - 0.5)/201) \qquad \text{Eq. 2}$$

Thus, for example, the point with rank 76 on plot 310 was assigned a normal Z-score of −0.317 by use of Eq. 1 and the point with rank 76 on plot 320 was assigned a normal Z-score of −0.634. Plot 330 of FIG. 3 represents a Q-Q plot of a standard normal distribution (since the input process parameters varied in a Gaussian manner). Thus, the x-value and y-value of each point on the plot are equal and plot 330 is a straight line. In general, plotting a standard normal distribution against a Q-Q plot of another distribution can graphically display how the other distribution differs from a normal distribution.

Figure 4:
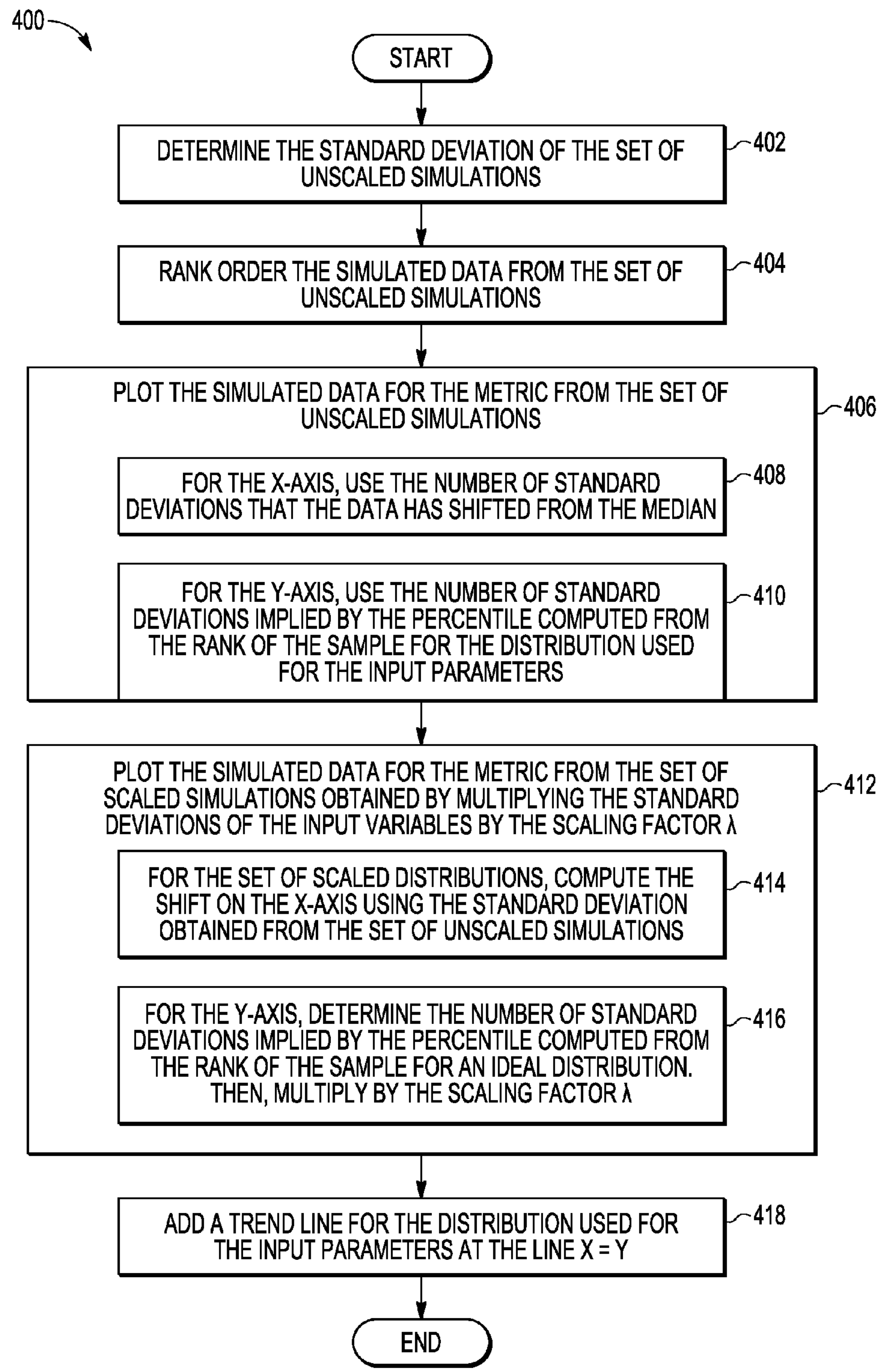
FIG. 4 is a flow diagram illustrating the generation of an unscaled Q-Q plot, a scaled Q-Q plot, and a theoretical trend line in accordance with a specific embodiment of the present disclosure.

FIG. 4 is a data flow diagram 400 illustrating the generation of Q-Q plots. The process can produce plots such as plots 300 of FIG. 3. The plots can display data from a set of unscaled simulations and a set of scaled simulations. The simulations can simulate the results of a process, such as the manufacturing of an IC according to an IC design. In that case, the points on the Q-Q plots represent performance information of the IC being modeled. The scaled simulations can be produced by multiplying the standard deviations of the input variables of a model of the process by a scaling factor λ. A standard deviation of the set of unscaled simulations is determined at block 402. The standard deviation can be calculated using percentiles. For example, for a normal distribution, this value corresponds to the sum of the absolute deviations from the median of the 30.85 percentile (−0.5 sigma) and 69.15 percentile (+0.5 sigma) of the simulated metric. Alternatively, the standard deviation can be calculated using standard formulas, such as $$\sigma = \sqrt{\frac{1}{N}\sum_{i=1}^{N}(x_i - \mu)^2} \qquad \text{Eq. 3}$$

or $$s = \sqrt{\frac{1}{N-1}\sum_{i=1}^{N}(x_i - \overline{x})^2} \qquad \text{Eq. 4}$$

In Eq. 3, a complete set of samples is used. First, the median, μ, is calculated, and then the standard deviation σ is calculated from the median x. In Eq. 4, only a subset of the complete sample set is used. First, the median $\overline{x}$ from the subset is calculated, and the standard deviation of the sample, s, is calculated from the median $\overline{x}$.

At block 404, the simulated data is rank ordered from its lowest value to its highest value. Each sample is then assigned a rank with the lowest receiving a rank of 1 and the rank of the highest being equal to the number of samples that have been simulated. In other embodiments, the numbering can range from 0 to the number of samples minus 1. Method 400 continues with the simulated data for the metric from the set of unscaled simulations being plotting at block 406. For the X-axis, method 400 uses the number of standard deviations that the data has shifted from the median, at block 408. For the Y-axis, the number of standard deviations implied by the percentile computed from the rank of the sample for the distribution used for the input parameters is used at block 410.

Method 400 continues with the simulated data for the metric from the set of scaled simulations being plotting at block 412. As indicated above, the scaled simulations can be produced by multiplying the standard deviations of input variables of a model by a scaling factor λ. For the X-axis, method 400 uses the number of standard deviations that the data has shifted from the median of all the samples in the set of scaled simulations, at block 414. The value of the standard deviation is the value calculated for the unscaled sample as described above at block 402. At block 416, for the Y-axis, the number of standard deviations implied by the percentile computed from the rank of the sample for the distribution used for the input parameters is calculated, and that result is multiplied by the scaling factor λ. At block 418, a trend line is added illustrating the distribution used for the input parameters. For the trend line, the same values are used for the X-axis and Y-axis as were used for the Y-axis in block 416. The trend line can satisfy the equation x=y. A Q-Q plot constructed as in block 418 is called a Normal Probability Plot if the resulting distribution is assessed versus a Normal distribution function.

Figure 5:
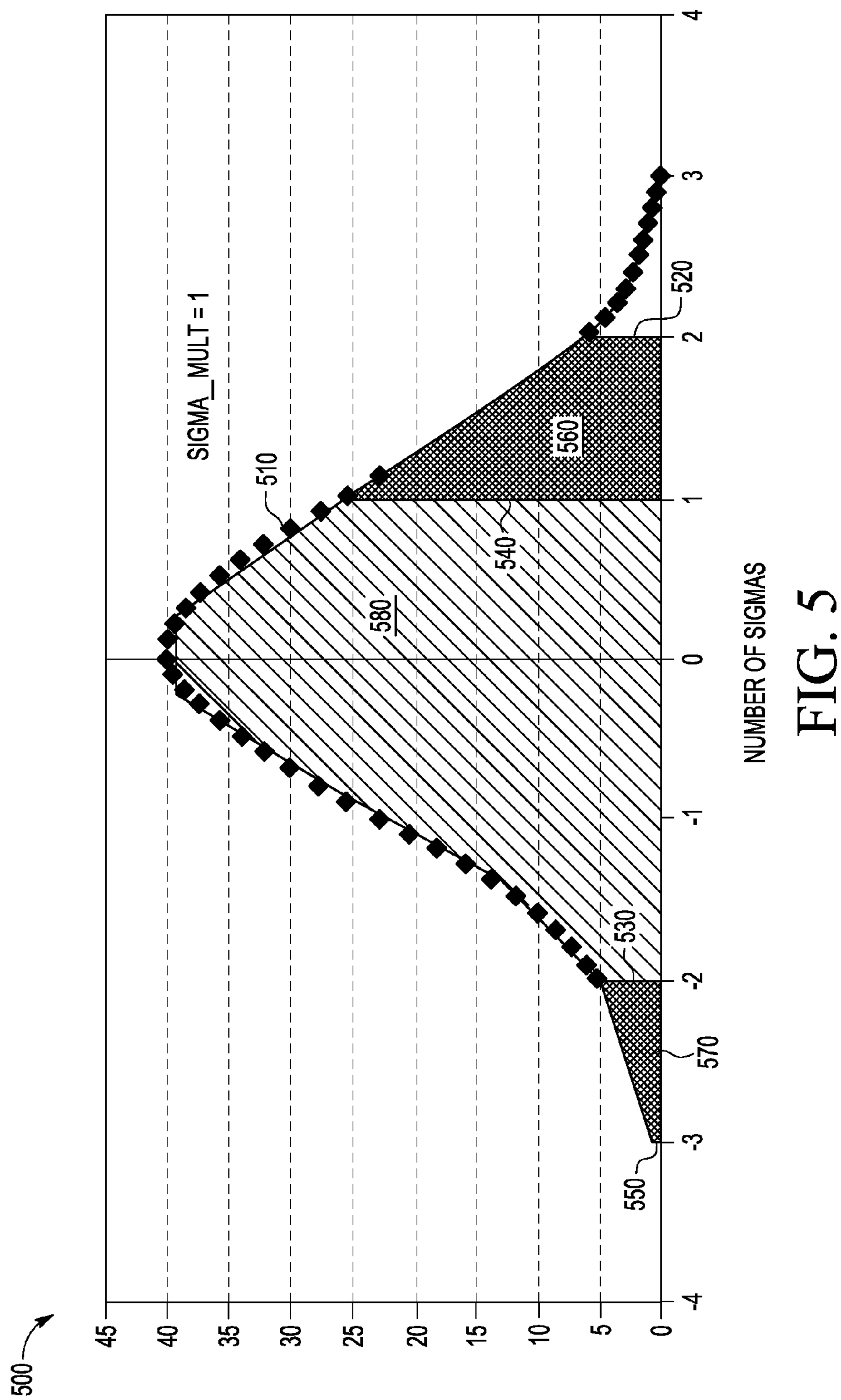
FIG. 5 is a graph illustrating yield of a process and the effects of process shift on yield in accordance with a specific embodiment of the present disclosure.

FIG. 5 is a graph illustrating an expected yield of an IC based upon a distribution of a metric of an output of the manufacturing process; e.g., based upon a physical or performance characteristic of the IC, in accordance with at least one embodiment of the present disclosure. Graph 500 includes plot 510, specification limits 520, 530, 540, and 550, and yield areas 560, 570, and 580. Plot 510 can represent the probability distribution of a metric applied to the IC and can be formulated through use of scaled sigma sampling. Vertical lines 520 and 530 represent the upper and lower specification limits of such a metric of the IC and delimit the region $+/-2\sigma$ from the median in this case. The manufacturing specifications may, for example, require that the response to an electrical input falls within two standard deviations of the median value.

The yield of an IC whose figure of merit has the probability distribution represented by plot 510 and upper and lower specification limits delineated by vertical lines 520 and 530 is area 580, the area under plot 510, bounded on the left by vertical line 530 and on the right by the vertical line 520. Area 580 includes subarea 560, the area under plot 510 and within the region from $+1\sigma$ to $+2\sigma$ from the median.

Vertical lines 540 and 550 delimit the region $-3\sigma$ and $+1\sigma$ from the median and may be thought of as representing the upper and lower specification limits that can result in response to a process shift of $+1\sigma$ to the right. A semiconductor process shift can result from intentional or unintentional shifts in process flow and equipment.

In FIG. 5, after a process shift of $+1\sigma$ to the right, the yield of a product whose model is represented by plot 510 is the area under the plot 510, bounded on the left by vertical line 550 and on the right by the vertical line 540. As a result, the yield of the IC represented by graph 510 no longer includes the area represented by region 560, since that region is to the right of the upper specification limit. The area representing the yield is, however, increased by area 570, which is now within the specification limits. Since area 570 is smaller than area 560, in the above example, the result of a process shift $+1\sigma$ to the right is to reduce the yield of the product.

In some instances, the use of the scaled sigma sampling process to model ICs may yield accurate assessment of low-probability tails without requiring a large number of samples, even for integrated circuits whose models may require long simulation times. In particular, in some instances, use of the process may verify yields for integrated circuits containing a large number of components. Further, use of this process may not require visibility into the input process parameter space that corresponds to the desired output space. In addition, the process may provide some immunity for known or unknown SPICE model inaccuracies. In contrast, traditional sampling techniques may have difficulty in providing visibility to integrated design failures below about 1000 parts per million (ppm), especially for designs with a large number of sensitive process parameters or those with very large simulation times.

The use of the scaled sigma sampling process may also enable the assessment of the robustness of an IC design in the event of some unfinished simulations, the evaluation of the simulation engine on samples that does not yield a result. Simulations may sometimes not finish due to insufficient allocation of processing time, network outage, processor malfunction, model exceptions, convergence problems or some other such reason.

In case of unfinished simulations, a worst case assessment can be made by assuming that all of the unfinished simulations represent system failures for the purpose of determining the yield or other desired attribute of the system. If the system meets the requirements under that assumption, then the design is deemed acceptable. Conversely, if the users have mitigating information, one can assume that all of the unfinished simulations would have satisfied system requirements. If the system fails the requirements under this assumption, then the simulations indicate that the design is not acceptable per specifications. Otherwise, depending upon circumstances, more time may have to be allocated for simulations.

Figure 6:
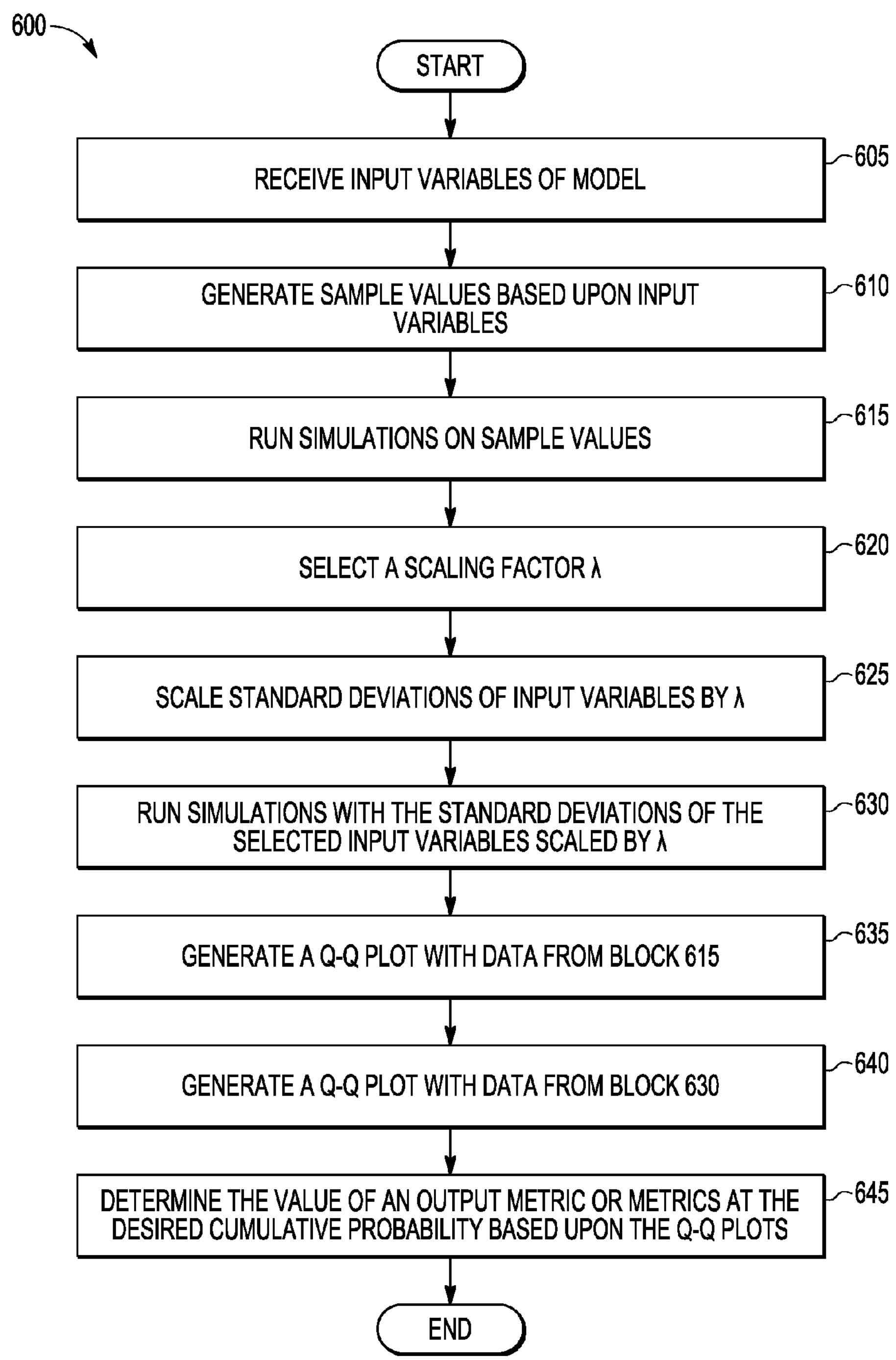
FIG. 6 is a flow diagram illustrating modeling an IC design system in accordance with a specific embodiment of the present disclosure.

FIG. 6 is a data flow diagram 600 illustrating performance of scaled sigma sampling in accordance with embodiments of the present disclosure. The process of scaled sigma sampling can be performed by a system such as system 100 of FIG. 1. The scaled sigma sampling process can utilize a model of a manufacturing process or other such processes. In many cases, the model can be used to simulate an IC using a simulation engine such as SPICE. SPICE is a general-purpose, analog electronic circuit simulator used in the semiconductor industry. At block 605, the input variables of the model are received. A user can, for example, supply the specifications of components of a manufacturing process to a modeling tool. The specifications may include information about probability distributions of properties of the components. At block 610, a samples generator generates sample values for the components in accordance with the supplied parameters.

At block 615, a simulation engine, such as the simulator 130 of FIG. 1, runs a set of Monte Carlo simulations, using the sample values. At block 620 a scaling factor $\lambda$ is selected for scaling the standard deviation of the input variables to the model. In some embodiments, the scaling factor $\lambda$ may be selected in order to calculate the properties of the IC up to a desired number of sigmas while limiting the required number of samples to an acceptable number. If the number of samples allowed by the computational resources permit the assessment of the behavior of the IC to s sigmas within the desired confidence interval and if an assessment up to d sigmas was desired, where $d>s$, then $\lambda$ can be selected as $d/s$. As an example, suppose computational resources permit at most 1000 simulations of an integrated circuit, thereby allowing an assessment of the behavior of the IC to 3 sigmas for the desired confidence interval for the estimate. Then selecting $\lambda=2$ may enable assessing the behavior up to 6 sigmas without increasing the computational effort, assuming that the scaling preserves the properties of the model.

At block 625 the standard deviations of the input variables are scaled by $\lambda$. In many cases, such scaling enables examination of a process at low-probability tails. In the case of a normally distributed circuit metric, scaling the standard deviations of all of the input variables by $\lambda$ also results in scaling the standard deviation of the output metric by $\lambda$. Accordingly, a sample sufficient to enable the assessment of the output to a given number n of sigmas under the original distribution may suffice to enable the assessment of the output of the scaled distribution to $\lambda \times n$ sigmas. Conversely, the behavior of the scaled distributions at $n/\lambda$ scaled sigmas may correspond to the behavior of the original distribution at n unscaled sigmas.

At block 630, simulations are run with the standard deviations of the input variables scaled by $\lambda$. At blocks 635 and 640, Q-Q plots are generated from the data produced at blocks 615 and 630 respectively. The Q-Q plots can be generated from the sample data by the process described in connection with FIG. 3. In many embodiments, the two Q-Q plots can be graphed in the same diagram. In further embodiments, a third Q-Q plot (theoretical plot) can be added that illustrates the behavior of a linear IC. This Q-Q plot can be represented with a straight line satisfying the equation $x=y$. A Q-Q plot constructed this way is called a Normal Probability Plot if the resulting distribution is assessed versus a Normal distribution function.

At block 645, the yield within specification limits or the value of another output metric at the desired cumulative probability is determined based upon the Q-Q plots. The output metric may be another parameter of an IC. The Q-Q plots can help construct the probability distribution function for the circuit metric. In one embodiment, if the Q-Q plot generated from the scaled distribution appears to accurately represent the process being modeled, the plot can be adjusted using the Q-Q plot generated from the original (unscaled) distribution and used to determine the properties of the model metric at the tails.

Determination of the accuracy of the scaled Q-Q plot can involve examining the slope of the scaled Q-Q plot at various points on the plot. The examination may be done by performing calculations based on points lying on the scaled Q-Q plot or may be done visually by inspecting a graph of the scaled Q-Q plot. If the slope is close to the theoretical value of +1 or is greater, than the scaled Q-Q plot can yield an accurate or, in some cases, a mildly conservative estimate of yield of a process. If the slope decreases significantly, such as by more than 1 at two locations that are 0.5 sigmas from each other, then the estimate of the yield may, in some cases, not be accurate enough or somewhat optimistic, and it may be prudent to refine the yield assessment using a different method, such as Importance Sampling.

Figure 7:
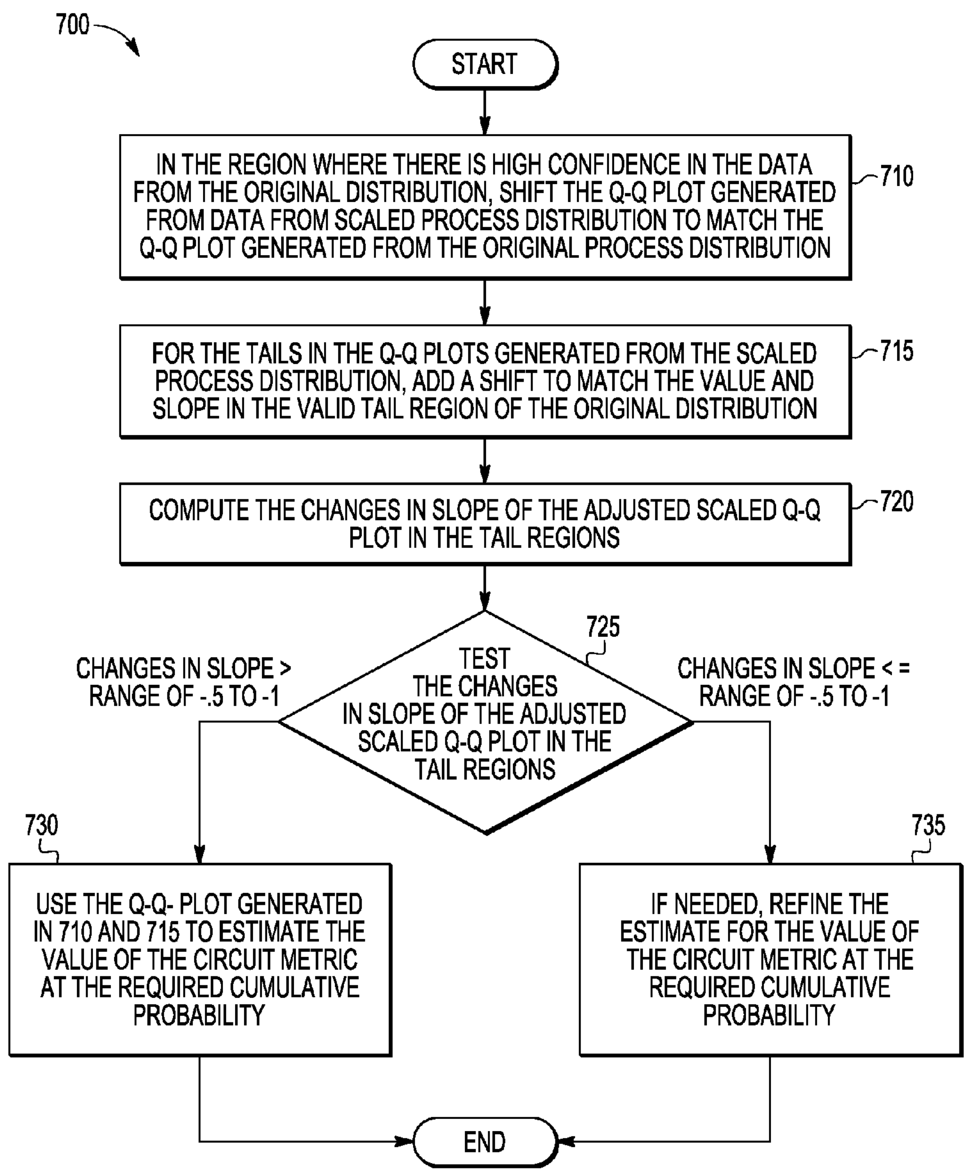
FIG. 7 is a flow diagram illustrating assessing the results of a simulation by examining Q-Q plots in accordance with a specific embodiment of the present disclosure.

FIG. 7 is a flow diagram 700 illustrating a method for evaluating results of a simulation by examining Q-Q plots using both regular samples and scaled-distribution samples. Method 700 can elaborate on block 645 of FIG. 6. At block 710, in the region where there is high confidence in the data from the original distribution (i.e. ignoring the data at the very extremes where it can be noisy), the Q-Q plot generated from data from scaled process distribution is shifted or adjusted to match the Q-Q plot generated from the original process distribution. The shifting can comprise shifting the scaled Q-Q plot so that its median coincides with the median of the unscaled Q-Q plot.

The confidence of data can be determined by standard statistical methods, based upon the sample size and the desired degree of confidence. Confidence in the data increases with sample size. Every point on a Q-Q plot has a range of confidence, based upon the number of sigmas at which it lies. The further out on the curve, the more the uncertainty and the less the confidence. In some embodiments, the confidence in the unscaled Q-Q plot in a region can be determined by the density of points of the plot in the region. As an example, a region where there is no visibility from the unscaled Q-Q plot on a grid for Z-scores that is no coarser than 0.25 sigmas; e.g., due to no or too few data points, can be determined to be beyond the confidence range of the unscaled Q-Q plot. At block 715, the tails in the Q-Q plots generated from the scaled process distribution, beyond the confidence range of the unscaled Q-Q plot, are shifted to match the value and slope of the extreme regions in the valid tail region of the original distribution. The result of the method of FIG. 7 may be to copy the tails of the scaled Q-Q plot onto the unscaled Q-Q plot at the edge of the region of confidence in the unscaled Q-Q plot, thereby forming a composite Q-Q plot.

Figure 8:
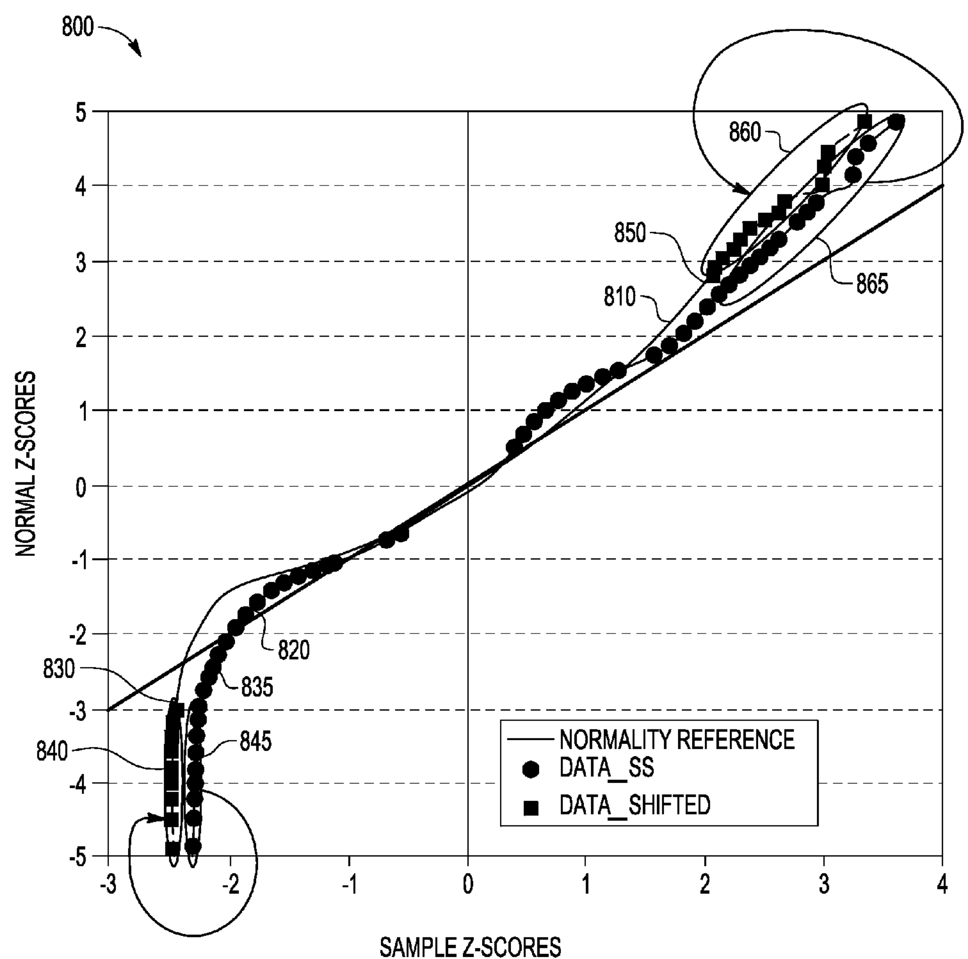
FIG. 8 is a graph illustrating shifting a scaled Q-Q plot in accordance with a specific embodiment of the present disclosure.

Turning to FIG. 8, illustrated is a graph 800 demonstrating the process of shifting a scaled Q-Q plot. Graph 800 includes unscaled Q-Q plot 810 and scaled Q-Q plot 820. Points 830 and 850 lie on unscaled Q-Q plot 810 and point 835 lies on scaled Q-Q plot 820. Segments 840 and 860 are attached to unscaled Q-Q plot 810, and segments 845 and 865 are part of scaled Q-Q plot 820. Q-Q plots 810 and 820 may, for example, represent a range of response times of instances of an IC.

In FIG. 8, the region of confidence in unscaled Q-Q plot 810 extends from point 830 on the left to point 850 on the right. Accordingly, in this region, unscaled Q-Q plot 810 can be used to assess the results of a simulation. Beyond this region of confidence, the tails of Q-Q plot 820 are shifted to match the value and slope in the valid tail region of the original distribution, as represented by unscaled Q-Q plot 810. One such shift was to shift scaled Q-Q plot 820 to meet unscaled Q-Q plot 810 at point 830. At that point, scaled Q-Q plot 820 lies to the right of unscaled Q-Q plot 810; that is, the point 835 on Q-Q plot 820 with the same y coordinate as point 830 has a higher x-coordinate. Segment 845 is the tail region of Q-Q plot 820 beginning at point 835, the portion of Q-Q plot 820 extending beyond point 835 in the direction of smaller x-coordinates. In graph 800, segment 845 is adjusted or shifted by moving it leftward to begin at point 830 of unscaled Q-Q plot 810, thereby forming segment 840. Similarly, segment 865 of scaled Q-Q plot 820 is shifted to extend beyond point 850 of unscaled Q-Q plot 810, thereby forming segment 860. The result of the process described in FIG. 8 is to produce a cumulative probability distribution function which extends beyond the probability distribution function based upon the unscaled sample. In the example of FIG. 8, the cumulative function is the unscaled Q-Q 810 as extended by segments 840 and 860, which were shifted from scaled Q-Q plot 820. In other words, the shifted scaled Q-Q plot consists of the unscaled Q-Q plot in its region of confidence, extended by the tails of the scaled Q-Q plot, shifted to align with the unscaled Q-Q plot.

Returning to FIG. 7, at block 720, method 700 includes computing the slopes of the scaled Q-Q plot in the tail regions. The slope in a subinterval of the y-axis (the axis representing normal Z-scores) can be calculated by the formula $$\frac{\Delta\ \text{sample\_Z-score}}{\Delta\ \text{normal\_Z-score}},$$

wherein Δ indicates a difference between two Z-scores. At block 725, the changes in the calculated slopes are tested. Moving away from the median to the ends of the distribution, within the specification limits, the changes in slope at neighboring z-scores separated by 0.5 sigma are calculated. If the slope decreases in the range of 0.5 to 1.0 or more, the cumulative probability distribution function produced at blocks 710 and 715 may be inaccurate for estimating a value of a metric to be applied to the simulation at a required cumulative probability. They may, for example, overestimate the yield within certain sigma ranges. Thus, at block 735, the assessment may be refined using a lower scale factor for the distribution or through use of a more rigorous sampling technique like importance sampling or statistical blockade. Importance sampling may involve modifying the distributions of the input variables in order to produce more outputs within a desired range. Success at importance sampling may require a good understanding of the parametric sensitivities of the circuit metric. The statistical blockade method may combine machine learning and extreme value theory to simulate rare events. Again, the technique may involve attempting to determine the effect of parametric sensitivities of the circuit metric, and using the knowledge to generate outputs within a desired region. Conversely, if the change in the calculated slopes is greater than −0.5 to −1 for all such pairs of neighboring z-scores, then the Q-Q plot generated at blocks 710 and 715 may be used to estimate the value of the circuit metric.

In some cases, the refinement may apply to only a portion of the tail regions of the adjusted scaled Q-Q plot. A region of the adjusted scaled Q-Q plot may not need refinement if it extends from the region of accuracy of the unscaled distribution and the changes in slope within the region of interest (for yield calculation) are greater than −0.5 to −1.0 at any two neighboring z-scores separated by 0.5 sigma. In that case, the estimate obtained above in 720 may be accurate. As an example, suppose the unscaled Q-Q plot is accurate in a range of +/−3σ, the range of interest is +/−6σ, and the changes of slope for the adjusted scaled Q-Q plot is greater than −0.5 in the range of −3σ to −6σ and from +3σ to +5σ. In that case, refinement of the adjusted scaled Q-Q plot may be necessary only in the region from +5σ to +6σ. This refinement may produce a plot that may be used to more accurately assess a design model of an IC than the adjusted scaled Q-Q plot. The refined plot may, for example, more accurately assess yield.

In other embodiments, other methods of shifting or adjusting the scaled distribution may be used that also employ the changes in slope of the scaled plot in its tail regions. For example, the scaled Q-Q plot may be shifted so that its median coincides with the median of the unscaled Q-Q plot, and the shifted Q-Q plot may be used to assess an IC. In addition, other methods of gauging the accuracy of the scaled Q-Q plot may be used. The changes in slope may be compared to numbers slightly different than −1, for example a different number between −0.5 and −1.5. The slope may, for example, be compared to the slope of the trend line or to the slope of the unscaled Q-Q plot in the tail of its region of confidence. In many embodiments, historical data about the behavior of similar ICs s may be used to gauge the accuracy of the scaled Q-Q plot. In some embodiments, multiple crossings of the scaled Q-Q plot and the trend line in the tail regions may indicate that the scaled Q-Q plot should not be used to assess the behavior of an IC in the tail regions.

In several embodiments, the method of FIG. 7 may be used to obtain a conservative estimate of the percentage or amount of samples within a specified range of the median. Alternatively, in order to obtain a good estimate of the behavior of a process being sampled at a reasonable computational cost, the adjusted scaled Q-Q plot may be used regardless of the changes in slopes at the tail regions. Further, when the goal is to obtain a conservative estimate of the percentage of samples falling beyond specified limits, then the changes in slope may be compared to another number.

Figure 9:
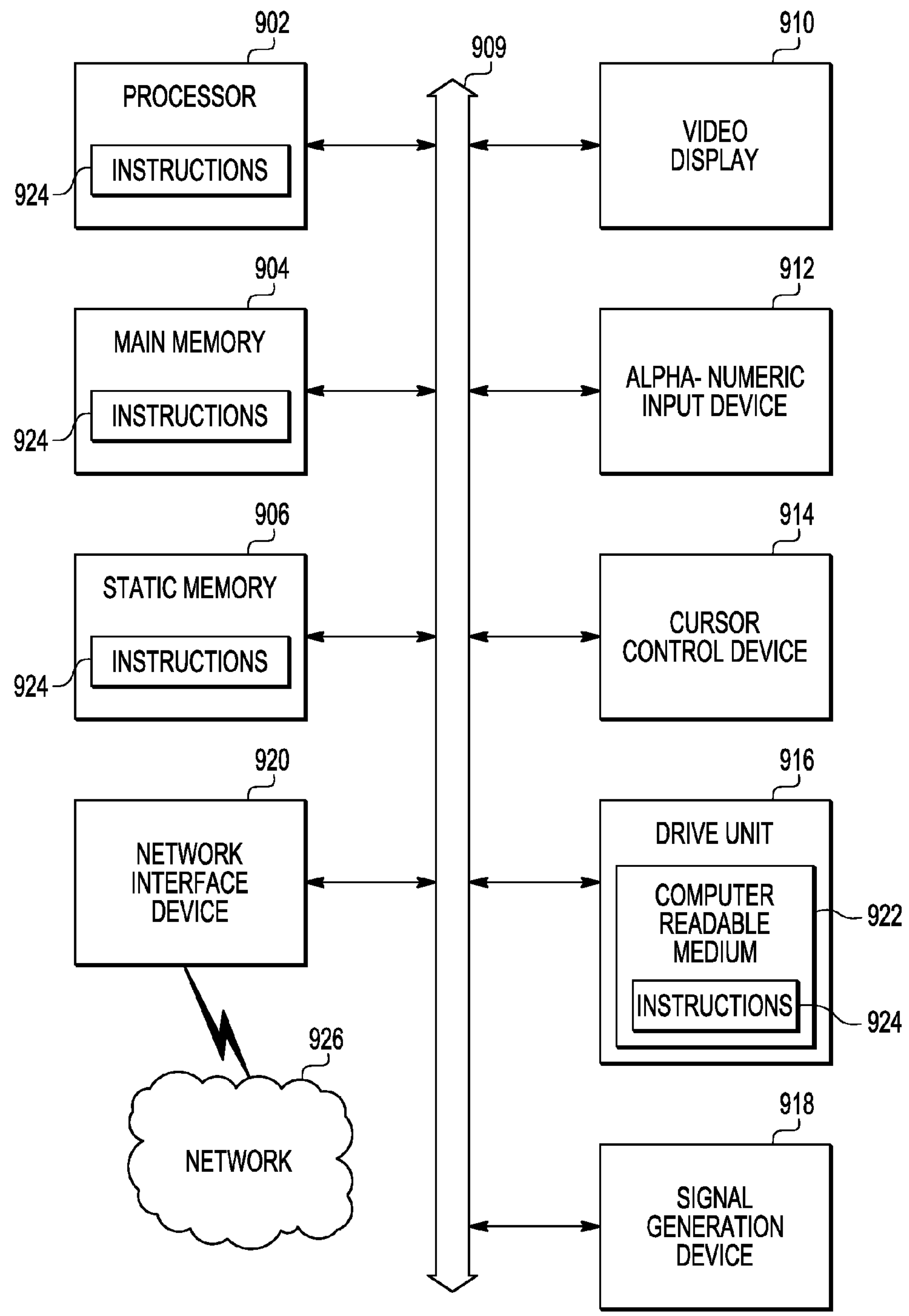
FIG. 9 is a block diagram of a processing system in accordance with at least one embodiment of the present disclosure.

FIG. 9 is a block diagram of a data processing system 900 in accordance with at least one embodiment of the present disclosure. The processing system 900 can include a set of instructions that can be executed to manipulate the processing system 900 to perform any one or more of the methods or functions disclosed above. The processing system 900 may operate as a standalone device or may be connected, e.g., using a network, to other processing systems or peripheral devices.

In a networked deployment, the processing system may operate in the capacity of a server or as a client user computer in a server-client user network environment, or as a peer processing system in a peer-to-peer (or distributed) network environment. Further, while a single processing system 900 is illustrated, the term "system" shall also be taken to include any collection of systems or sub-systems that individually or jointly execute a set, or multiple sets, of instructions to perform one or more computer functions.

The processing system 900 includes one or more processors 902, e.g., a central processing unit (CPU), a graphics processing unit (GPU), or both. Moreover, the processing system 900 can include a main memory 904 and a static memory 906 that can communicate with each other via a bus 908. As shown, the processing system 900 further includes a video display unit 910, such as a liquid crystal display (LCD), an organic light emitting diode (OLED), a flat panel display, a solid state display, or a cathode ray tube (CRT). Additionally, the processing system 900 includes an input device 912, such as a keyboard, and a cursor control device 914, such as a mouse. The processing system 900 can also include a disk drive unit 916, a signal generation device 918, such as a speaker, and a network interface device 920.

In a particular embodiment, as depicted in FIG. 9, the disk drive unit 916 includes a computer readable medium 922 in which one or more sets of instructions 924, e.g. software, can be embedded. Further, the instructions 924 may embody one or more of the methods or logic as described herein. In a particular embodiment, the instructions 924 may reside completely, or at least partially, within the main memory 904, the static memory 906, and/or within the processor 902 during execution by the processing system 900. The main memory 904 and the processor 902 also include computer readable media. The network interface device 920 can provide connectivity to a network 926, e.g., a wide area network (WAN), a local area network (LAN), or other network.

In accordance with various embodiments of the present disclosure, the methods described herein may be implemented, in whole or in part, by software programs executable by the processing system 900. The present disclosure contemplates a computer readable storage device (e.g., the main memory 904, the static memory 906, or the drive unit 916) that includes instructions 924 or receives and provides instructions 924 for execution. Further data representative of a device design can be stored in one or more of the computer readable storage devices for access by the processing system 900 during execution of the instructions 924 so as to implement the methods described above.

While the computer readable storage device is shown to be a single storage device, the term "computer readable storage device" includes a single storage device or multiple storage devices, such as a centralized or distributed database, and/or associated caches and servers that store one or more sets of instructions. The term "computer readable storage device" shall also include any storage device that is capable of storing a set of instructions for execution by a processor or that causes a processing system to perform any one or more of the methods or operations disclosed herein.

In a particular non-limiting, exemplary embodiment, the computer readable storage device can include a solid-state memory such as a memory card or other package that houses one or more non-volatile read-only memories. Further, the computer readable storage device can be a random access memory or other volatile re-writeable memory. Additionally, the computer readable storage device can include a magneto-optical or optical medium, such as a disk or tapes or other storage device.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and processing systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

As used herein, the term “circuit portion” shall refer to portions of a processing system used to implement various described operations. For example, processing system 900 can include a circuit portion that includes the processor 902 and portions of main memory 904 to generate samples as described herein. System 900 can include another circuit portion that includes the processor 902 and other portions of main memory 904 to simulate an IC design. Alternatively, various circuit portions of other types can be used, such as logic circuitry that is dedicated to implementing a specific operation.

In this document, relational terms such as “first” and “second”, and the like, may be used solely to distinguish one entity or action from another entity or action without necessarily requiring or implying any actual relationship or order between such entities or actions or any actual relationship or order between such entities and claimed elements. The term “another”, as used herein, is defined as at least a second or more. The terms “including”, “having”, or any variation thereof, as used herein, are defined as comprising.

Other embodiments, uses, and advantages of the disclosure will be apparent to those skilled in the art from consideration of the specification and practice of the disclosure disclosed herein. The specification and drawings should be considered as examples only, and the scope of the disclosure is accordingly intended to be limited only by the following claims and equivalents thereof.

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

As an example, the techniques described herein, while often discussed in connection with ICs, may be used to analyze other electronic components and may be used to analyze the results of processes. In addition, other methods of producing Q-Q plots may be used. Other formulas, for example, may be used to determine the percentage ranking of a value. For example, the formula converting ranking into percentile may vary. The ith point of n points in total may, for example, be assigned the value i/(n+1) or the value i/n. These percentiles may be then converted to the number of standard deviations. In other embodiments, both the x and y axis may be measured in quantiles. The kth Q-quantile of a distribution of a random variable is the value x for which the probability that the variable is less than x is k/4. As an example, the median of a distribution is a 2nd-quantile, since the probability that the random variable is less than the median is ½. In other embodiments, the x-axis and the y-axis may be switched. Thus, in some embodiments, the x-axis may represent normal Z-scores and the y-axis may represent sample Z-scores.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising: using a processing system, receiving an integrated circuit (IC) design;

generating a first plurality of sample values including a first set of sample values for a first characteristic of the IC design based upon a first predefined probability distribution of the first characteristic and including a second set of sample values for a second characteristic of the IC design based upon a second predefined probability distribution of the second characteristic;

simulating, based upon the IC design, to determine a first set of IC performance information, wherein each IC performance information of the first set represents an expected performance of an IC device having a corresponding first pair of sample values, each corresponding first pair of sample values including a corresponding sample value of the first set of sample values and of the second set of sample values;

generating a second plurality of sample values including a third set of sample values for the first characteristic of the IC design based upon a third predefined probability distribution of the first characteristic of the IC design and including a fourth set of sample values for the second characteristic of the IC design based upon a fourth predefined probability distribution of the second characteristic of the IC design, wherein the third predefined probability distribution is obtained by scaling a standard deviation of the first predefined probability distribution by a scaling factor λ that is a real number greater than 1.0, and wherein the fourth predefined probability distribution is obtained by scaling a standard deviation of the second predefined probability distribution by the scaling factor λ;

simulating, based on the IC design, to determine a second set of IC performance information, wherein each IC performance information of the second set represents an expected performance of an IC device having a corresponding second pair of sample values, each corresponding second pair of sample values including a corresponding sample value of the third set of sample values and of the fourth set of sample values; and determining a manufacturing characteristic of integrated circuits based on the first and second set of IC performance information.

2. The method of claim 1, wherein the determining the manufacturing characteristic comprises producing a Quantile-Quantile (Q-Q) plot of the first set of IC performance information (first Q-Q plot) and a Q-Q plot of the second set of IC performance information (second Q-Q plot).

3. The method of claim 2, wherein the determining the manufacturing characteristic further comprises producing a Q-Q plot of a purely normal distribution or the first predefined probability distribution.

4. The method of claim 2, wherein:

the determining the manufacturing characteristic further comprises placing the first Q-Q plot and the second Q-Q plot on a single graph, wherein:

a first axis of the graph represents sample Z-scores, a second axis of the graph represents normal Z-scores, the sample Z-scores both for points on the first Q-Q plot and for points on the second Q-Q plot are calculated from a standard deviation of the first set of IC performance information, and the normal Z-score of each point z on the second Q-Q plot is calculated by:

determining an initial normal Z-score of the point z based on a percentile implied by a rank of the point, and multiplying the initial normal Z-score by the scaling factor λ.

5. The method of claim 4 further comprising:

adjusting the second Q-Q plot, the adjusting comprising:

in a region where there is high confidence in data from the first set of IC performance information, shifting the second Q-Q plot to match the first Q-Q plot; and in tail regions of the second Q-Q plot extending beyond the region of high confidence, shifting the second Q-Q plot such that a value and a slope match a value and a slope of a tail of the first Q-Q plot in the region of high confidence, thereby extending the first Q-Q plot by the shifted region of the second Q-Q plot.

6. The method of claim 5, wherein the determining the manufacturing characteristic comprises computing a yield of the integrated circuits within specification limits for the integrated circuits based upon the adjusted second Q-Q plot.

7. The method of claim 5 wherein the determining the manufacturing characteristic comprises:

evaluating an accuracy of the adjusted second Q-Q plot in the tail regions for determining the manufacturing characteristic;

if the adjusted second Q-Q plot is determined to be accurate, determining the manufacturing characteristic based in part upon a behavior of the adjusted second Q-Q plot in the tail regions; and if the adjusted second Q-Q plot is determined not to be accurate enough, determining the manufacturing characteristic by means of techniques other than scaled sigma sampling.

8. The method of claim 7 wherein the evaluating the accuracy of the adjusted second Q-Q plot comprises:

determining slopes of the adjusted second Q-Q plot in a region where there is no visibility from the first Q-Q plot on a grid for Z-scores that is no coarser than 0.25 sigmas;

determining changes in the slopes between normal Z-score values that are separated by 0.5 sigmas;

determining the adjusted second Q-Q plot is accurate if the changes in the slopes moving away from a median of the second Q-Q plot are greater than −0.5 to −1.0; and determining the adjusted second Q-Q plot is not accurate if a change in a slope moving away from the median is less than −0.5 to −1.0.

9. The method of claim 8 wherein:

the determining the manufacturing characteristic comprises computing a yield of the integrated circuits; and the method further comprises:

determining that a change in slope in the tail regions of the second Q-Q plot moving away from the median between two normal Z-score values that are separated by 0.5 sigmas is less than −0.5 to −1.0;

determining, based upon the change of slope, that the adjusted second Q-Q plot is not accurate for purposes of determining yield; and determining a yield of the integrated circuits in a sub region of the tail regions of the second Q-Q plot by a technique other than use of the adjusted second Q-Q plot.

10. The method of claim 8 wherein:

the determining the slopes of the adjusted second Q-Q plot comprises applying the formula $$\frac{\Delta\ \text{sample\_Z-score}}{\Delta\ \text{normal\_Z-score}},$$

wherein Δ indicates a difference between two Z-scores.

11. The method of claim 8, when the adjusted second Q-Q plot is not accurate, the method further comprises:

selecting another scaling factor λ', wherein λ'<λ;

generating a third plurality of sample values including a fifth set of sample values for the first characteristic of the IC design based upon a fifth predefined probability distribution of the first characteristic of the IC design and including a sixth set of sample values for the second characteristic of the IC design based upon a sixth predefined probability distribution of the second characteristic of the IC design, wherein the fifth predefined probability distribution is obtained by scaling the standard deviation of the first predefined probability distribution by the scaling factor λ', and wherein the sixth predefined probability distribution is obtained by scaling a standard deviation of the second predefined probability distribution by the scaling factor λ';

simulating, based on the IC design, to determine a third set of IC performance information, wherein each IC performance information of the third set represents an expected performance of an IC device having a corresponding third pair of sample values, each corresponding third pair of sample values including a corresponding sample value of the fifth set of sample values and of the sixth set of sample values; and determining a manufacturing characteristic of the integrated circuits based on the first and third set of IC performance information.

12. The method of claim 1 wherein:

the method further comprises:

determining a desired number of standard deviations for simulation;

determining a likely number of standard deviations supported by a number of samples allowed by computational resources and a desired confidence interval for the simulation; and setting the scaling factor λ to a ratio of the desired number of standard deviations and a likely supported number of standard deviations.

13. The method of claim 1, wherein the generating the first plurality of sample values comprises:

determining a number of the first plurality of sample values based upon one or more of the following:

a time required to run simulations on the first plurality of sample values;

a number of processing units available for the simulations; and a load of the processing units.

14. The method of claim 1, wherein the determining the manufacturing characteristic comprises determining a treatment of unfinished simulations.

15. The method of claim 14, wherein:

the manufacturing characteristic is a yield; and unfinished simulations are treated as integrated circuits that fail specifications.

16. The method of claim 14 further comprising determining a minimum number of unfinished samples that need to be pursued to ensure that yield expectations are met.

17. A non-transitory computer readable medium storing a set of instructions, the set of instructions comprising instructions to manipulate a processing system to:

receive an integrated circuit (IC) design;

generate a first plurality of sample values including a first set of sample values for a first characteristic of the IC design based upon a first predefined probability distribution of the first characteristic and including a second set of sample values for a second characteristic of the IC design based upon a second predefined probability distribution of the second characteristic;

simulate, based upon the IC design, to determine a first set of IC performance information, wherein each IC performance information of the first set represents an expected performance of an IC device having a corresponding first pair of sample values, each corresponding first pair of sample values including a corresponding sample value of the first set of sample values and of the second set of sample values;

generate a second plurality of sample values including a third set of sample values for the first characteristic of the IC design based upon a third predefined probability distribution of the first characteristic of the IC design and including a fourth set of sample values for the second characteristic of the IC design based upon a fourth predefined probability distribution of the second characteristic of the IC design, wherein the third predefined probability distribution is obtained by scaling a standard deviation of the first predefined probability distribution by a scaling factor λ that is a real number greater than 1.0, and wherein the fourth predefined probability distribution is obtained by scaling a standard deviation of the second predefined probability distribution by the scaling factor λ;

simulate, based on the IC design, to determine a second set of IC performance information, wherein each IC performance information of the second set represents an expected performance of an IC device having a corresponding second pair of sample values, each corresponding second pair of sample values including a corresponding sample value of the third set of sample values and of the fourth set of sample values; and determine a manufacturing characteristic of integrated circuits based on the first and second set of IC performance information.

18. The computer readable medium of claim 17, wherein the set of instructions further comprises instructions to:

produce a Quantile-Quantile (Q-Q) plot of the first set of IC performance information (first Q-Q plot), a Q-Q plot of the second set of IC performance information (second Q-Q plot), and a Q-Q plot representing a purely normal distribution or the first predefined probability distribution;

place the first Q-Q plot and the second Q-Q plot on a single graph, wherein:

a first axis of the graph represents sample Z-scores;

a second axis of the graph represents normal Z-scores;

the sample Z-scores both for points on the first Q-Q plot and for points on the second Q-Q plot are calculated from a standard deviation of the first set of IC performance information; and the normal Z-score of each point z on the second Q-Q plot is calculated by:

determining an initial normal Z-score of the point z based on a percentile implied by a rank of the point; and multiplying the initial normal Z-score by the scaling factor λ; and adjust the second Q-Q plot, the adjusting comprising:

in a region where there is high confidence in the data from the first set of IC performance information, shifting the second Q-Q plot to match the first Q-Q plot; and in tail regions of the second Q-Q plot extending beyond the region of high confidence, shifting the second Q-Q plot such that a value and a slope match a value and a slope of a tail of the first Q-Q plot in the region of high confidence, thereby extending the first Q-Q plot by the shifted region of the second Q-Q plot.

19. A system comprising: a processor:

a first circuit portion configured to receive an integrated circuit (IC) design of an IC device including values of parameters of a first set of probability distributions of characteristics of the IC device;

a second circuit portion configured to:

receive the values, generate a first set of sample values of the characteristics of the IC device based upon the probability distributions of the characteristics of the IC device, and generate a second set of sample values of the characteristics of the IC device based upon a second set of probability distributions of the characteristics of the IC device, wherein the second set of probability distributions is obtained by scaling standard deviations of the first set of probability distributions by a scaling factor λ that is a real number greater than 1.0;

a third circuit portion configured to:

receive the IC device design from the first circuit portion, receive the first and second set of sample values of the characteristics of the IC device from the second circuit portion, simulate the IC device based upon the first set of sample values to generate a first set of expected IC performance information, and simulate the IC device based upon the second set of sample values to generate a second set of expected IC performance information; and a fourth circuit portion configured to determine a manufacturing characteristic of the IC device based on the first and second set of expected IC performance information.

20. The system of claim 19, wherein the fourth circuit portion is further configured to:

produce a Quantile-Quantile (Q-Q) plot of the first set of IC performance information (first Q-Q plot), a Q-Q plot of the second set of IC performance information (second Q-Q plot), and a Q-Q plot representing a purely normal distribution or the first predefined probability distribution;

place the first Q-Q plot and the second Q-Q plot on a single graph, wherein:

a first axis of the graph represents sample Z-scores;

a second axis of the graph represents normal Z-scores;

the sample Z-scores both for points on the first Q-Q plot and for points on the second Q-Q plot are calculated from a standard deviation of the first set of IC performance information; and the normal Z-score of each point z on the second Q-Q plot is calculated by:

determining an initial normal Z-score of the point z based on a percentile implied by a rank of the point; and multiplying the initial normal Z-score by the scaling factor λ; and adjust the second Q-Q plot, the adjusting comprising:

in a region where there is high confidence in the data from the first set of IC performance information, shifting the second Q-Q plot to match the first Q-Q plot; and in tail regions of the second Q-Q plot extending beyond the region of high confidence, shifting the second Q-Q plot such that a value and a slope match a value and a slope of a tail of the first Q-Q plot in the region of high confidence, thereby extending the first Q-Q plot by the shifted region of the second Q-Q plot.

* * * * *